Patented Sept. 12, 1950

2,521,812

UNITED STATES PATENT OFFICE 2,521,812

ESTER DERIVATIVES OF CHLOROMETHYL DIHYDROSAFROL

Herman Wachs, Brooklyn, N. Y., assignor to U. S. Industrial Chemicals, Inc., New York, N. Y., a corporation of Delaware No Drawing. Application April 27, 1949, Serial No. 90,042. In Brazil March 26, 1947

5 Claims. (Cl. 260—338)

This invention relates to new products which are useful ingredients of insecticides.

The products of the invention are esters of hydroxymethyl dihydrosafrol and various monocarboxylic acids, namely, unsubstituted, saturated, straight-chain aliphatic acids having from one to eighteen carbon atoms; unsubstituted, straight-chain aliphatic acids having from three to eighteen carbon atoms and one carbon to carbon double bond; monochlorinated, saturated, straight-chain aliphatic acids having from two to eighteen carbon atoms; levulinic acid; phenoxyacetic acid and benzoic acid.

Hydroxymethyl dihydrosafrol is a material having the formula and may be prepared from chlormethyl dihydrosafrol in accordance with the teachings of my copending application, Serial No. 658,872, filed April 1, 1946, of which application the present application is a continuation-in-part.

The new products, when they do not contain chlorine, are suitably prepared by heating the anhydrous sodium salt of the acid in contact with an equimolar quantity of chloromethyl dihydrosafrol, the reaction mixture also containing a small percentage of the free acid. The reaction mixture is then stirred at 140–160° C. for eight hours. After cooling, the reaction mixture is taken up in benzene, and is thereafter washed with water and sodium carbonate solution to remove the excess acid. The product is recovered by distillation of the reaction mixture in the usual manner. For example, when chloromethyl dihydrosafrol and sodium acetate are used as reactants, the reaction may be illustrated by the following equation:

In case the product is an ester of an acid having a boiling point higher than that of water, such product, whether an ester of a chlorinated acid or not, may be prepared simply by heating equimolecular quantities of hydroxymethyl dihydrosafrol and the acid in the absence of an esterification catalyst, the reaction being carried to completion by distilling the water of esterification from the reaction mixture with the aid of benzene in the known manner.

The following table contains data obtained in the Peet-Grady test on houseflies using various products falling within the scope of the present invention:

| Acid | Boiling range, °C. at mm. Hg pressure | I 2% 10 minutes KD/OTI | II 2% Kill/OTI | III 1%+30 mg. 10 minutes KD/OTI | IV 1%+30 mg. Kill/OTI |
|---|---|---|---|---|---|
| Formic | 120–3/1 | 0.18 | 0.45 | 0.91 | 0.55 |
| Acetic | 153–7/1 | 0.43 | 0.59 | 0.97 | 0.79 |
| n-Butyric | 182/9 | 0.29 | 1.00 | 0.96 | 0.85 |
| n-Dodecyl | 160–186/0.5 | 0.02 | 0.74 | 0.98 | 0.87 |
| 10-Undecyl | 174–5/0.5 | 0.26 | 0.79 | 0.94 | 0.56 |
| Oleic | 205–18/0.5 | | | 0.89 | 0.70 |
| Levulinic | 180–(189)–195/1.5 | 0.01 | 0.24 | 0.81 | 0.98 |
| Phenoxyacetic | 173–(185)–224/0.5 | 0.00 | 0.19 | 0.89 | 1.06 |
| 10-Chloro-undecyl | 165–190/0.5 | 0.15 | 0.43 | 0.89 | 0.85 |
| Benzoic | Melting point, 53–54° C | 0.08 | 1.48 | 0.91 | 0.65 |

In the preceding table, O. T. I. signifies the Official Test Insecticide, a solution of 100 mg. of pyrethrins in odorless kerosene.

The column headed I gives the ratio of the knockdown of a solution of 2% of the product in odorless kerosene at the end of 10 minutes to the knockdown of the O. T. I. at the end of 10 minutes.

The column headed II gives the ratio of the kill at the end of 24 hours of a 2% solution of the product in odorless kerosene to the kill of the O. T. I. at the end of 24 hours.

The column headed III gives the ratio of the knockdown at the end of 10 minutes of a solution of 1000 mg. of the product and 30 mg. of pyrethrins in 100 ml. of odorless kerosene to the knockdown of the O. T. I. at the end of 10 minutes.

The column headed IV gives the ratio of the kill at the end of 24 hours of a solution of 1000 mg. of the product and 30 mg. of pyrethrins in 100 ml. of odorless kerosene to the kill of the O. T. I. at the end of 24 hours.

Using the procedures described above, various other products falling within the scope of this invention may be prepared using, in the manner described above, palmitic acid, caproleic, lauroleic acid, palmitoleic acid, acrylic acid, monochloroacetic acid, alpha-chloropropionic acid, beta-chlorobutyric acid, acids formed by the addition of hydrogen chloride to any of the preceding unsaturated acids, etc.

The products of this invention may be employed in the conventional manner in insecticidal compositions. For example, they may be employed in solution in kerosene, as has been described above, or they may be used as an active ingredient of insecticidal dusts. Thus, a suitable dust may be prepared by incorporating 2.5% of the product and 0.2% of pyrethrins into a carrier such as exhausted pyrethrum flowers, and thereafter diluting the carrier with three or four parts of talc.

I claim:
1. The compounds of the generic formula

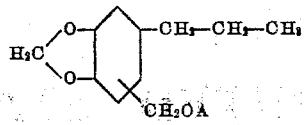

in which A is the acyl radical of a monocarboxylic acid selected from the group consisting of unsubstituted, saturated, straight-chain aliphatic acids having from one to eighteen carbon atoms; unsubstituted, straight-chain aliphatic acids having from three to eighteen carbon atoms and one carbon to carbon double bond; monochlorinated, saturated, straight-chain aliphatic acids having from two to eighteen carbon atoms; levulinic acid; phenoxyacetic acid and benzoic acid.

2. The compounds of claim 1 in which A is the acyl radical of an unsubstituted, saturated, straight-chain aliphatic acid having from one to eighteen carbon atoms.

3. The compounds of claim 1 in which A is the acetyl radical.

4. The compounds of claim 1 in which A is the acyl radical of levulinic acid.

5. The compounds of claim 1 in which A is the acyl radical of phenoxyacetic acid.

HERMAN WACHS.

No references cited.